United States Patent
Anderson (10) Patent No.: US 11,395,498 B2
(45) Date of Patent: Jul. 26, 2022

(54) DOUGH DIVIDER ASSEMBLY

(71) Applicant: Radco Infusion Technologies, Toledo, OH (US)

(72) Inventor: Rick Anderson, Waterville, OH (US)

(73) Assignee: RADCO INFUSION TECHNOLOGIES, LLC, Toledo, OH (US)

(*) Notice: Subject to any disclaimer, the term of this patent is extended or adjusted under 35 U.S.C. 154(b) by 328 days.

(21) Appl. No.: 16/367,543

(22) Filed: Mar. 28, 2019

(65) Prior Publication Data

US 2020/0305443 A1 Oct. 1, 2020

(51) Int. Cl.
*A21C 5/00* (2006.01)
*A21C 11/10* (2006.01)

(52) U.S. Cl.
CPC .............. *A21C 5/00* (2013.01); *A21C 5/006* (2013.01); *A21C 11/10* (2013.01)

(58) Field of Classification Search
CPC .................................. A21C 5/00; A21C 11/10
See application file for complete search history.

(56) References Cited

U.S. PATENT DOCUMENTS

| | | | |
|---|---|---|---|
| 3,349,438 A | 10/1967 | Baker et al. | |
| 4,350,710 A | 9/1982 | Sundermann | |
| 5,270,070 A * | 12/1993 | Campbell | A21C 5/00 425/311 |
| 5,340,599 A | 8/1994 | Maruyama et al. | |
| 5,350,290 A * | 9/1994 | Honings | A21C 5/00 425/311 |
| 5,503,861 A | 4/1996 | Atwood | |
| 6,303,168 B1 * | 10/2001 | Campbell | A21C 5/00 425/239 |
| 2006/0165860 A1 * | 7/2006 | Lowry | A21C 11/166 426/518 |
| 2012/0052155 A1 * | 3/2012 | Grote | A21C 9/08 426/19 |

FOREIGN PATENT DOCUMENTS

| | | |
|---|---|---|
| GB | 1540016 A | 2/1979 |
| JP | H02207735 A | 8/1990 |

OTHER PUBLICATIONS

Machine English translation of JP H02207735.

* cited by examiner

*Primary Examiner* — Timothy Kennedy
*Assistant Examiner* — Alexander A Wang
(74) *Attorney, Agent, or Firm* — Dinsmore & Shohl LLP (57) ABSTRACT

A dough dividing system includes a hopper for receiving dough constituent including a hopper inlet and a hopper outlet, a divider assembly including a divider block including a divider block cavity, and a first actuator, and a receptacle including a receptacle inlet. The first actuator moves the divider block to align the divider block cavity with the hopper outlet, the dough constituent enters the divider block cavity when the divider block cavity is aligned with the hopper outlet, the divider block moves to shear a dough form from the dough constituent, and the divider block moves the dough form over the receptacle inlet such that the dough form can empty from the divider block cavity.

19 Claims, 7 Drawing Sheets

DOUGH DIVIDER ASSEMBLY

TECHNICAL FIELD

The present specification generally relates to systems and methods for dividing dough, and more specifically, to systems and methods for dividing dough using a dough divider with a divider assembly.

BACKGROUND

Baking bread requires the heating of dough. Dough is formed from various raw products (e.g., flour, yeast, salt, etc.). Many variables affect the production quality of baked bread and to produce bread of consistent quality and quantity, these variables must be controlled. Examples of aspects that must be controlled include: dough composition and ingredient quality, dough temperature and age, ambient temperature and humidity, process and processing times, and various other factors. Engineering dough forming assemblies that can consistently produce dough with uniform composition and dimensions requires precise control of these variables.

It may be more efficient to mix dough constituents into a large constituent mass of dough rather than in individually sized amounts. Therefore, individual dough forms must be separated from the constituent mass before baking individual bread loaves. To bake individual bread loaves of consistent size, dough forms of consistent size must first be formed. To separate small amounts of dough (e.g., dough forms) from a larger amount of dough with consistency, systems and methods for producing dough forms may be desired.

SUMMARY

In one embodiment, a dough dividing system includes a hopper for receiving dough constituent including a hopper inlet and a hopper outlet, and a divider assembly including a divider block including a divider block cavity, and a first actuator. The first actuator moves the divider block to align the divider block cavity with the hopper outlet, the dough constituent enters the divider block cavity when the divider block cavity is aligned with the hopper outlet, the divider block moves to shear a dough form from the dough constituent, and the divider block moves the dough form such that the dough form can empty from the divider block cavity.

In another embodiment, a dough divider assembly includes a divider block cavity in a divider block, and a first actuator. The first actuator actuates to move the divider block between a first position and a second position, in the first position, the divider block cavity receives dough, as the divider block cavity moves from the first position to the second position, dough in the divider block cavity is separated from a mass of dough in a hopper, and in the second position, the divider block cavity is configured such that the dough exits the divider block cavity.

In yet another embodiment, a method of dividing dough into dough forms includes feeding a divider block cavity in a divider block with dough from a hopper outlet of a hopper that includes dough to at least partially fill the divider block cavity with dough from the hopper, actuating a first actuator that is coupled to the divider block to move the divider block with respect to the hopper outlet to separate a dough form from the dough, and moving the divider block such that the divider block cavity is aligned with a receptacle so that the dough form enters the receptacle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

It may be necessary to produce dough in sufficient quantity with a specific size and shape for baking consistently marketable bread products. The size and shape of dough may affect the properties of baked bread. For example, the size and shape may affect the amount of time required to bake bread, the quality of bread baked using a given size/shape of dough form, and/or other bread properties. By shaping the dough into consistent sizes and shapes before the dough is baked, a consistent bread product can be produced on a mass scale given a consistent backing process. Producing bread that is of consistently acceptable quality results in less waste of constituent products (e.g., yeast, flour, etc.), reduces the cost associated with purchasing constituent products, and reduces the overall cost of producing bread. Accordingly, systems and methods for producing consistently sized/shaped dough forms are required.

Figure 1:
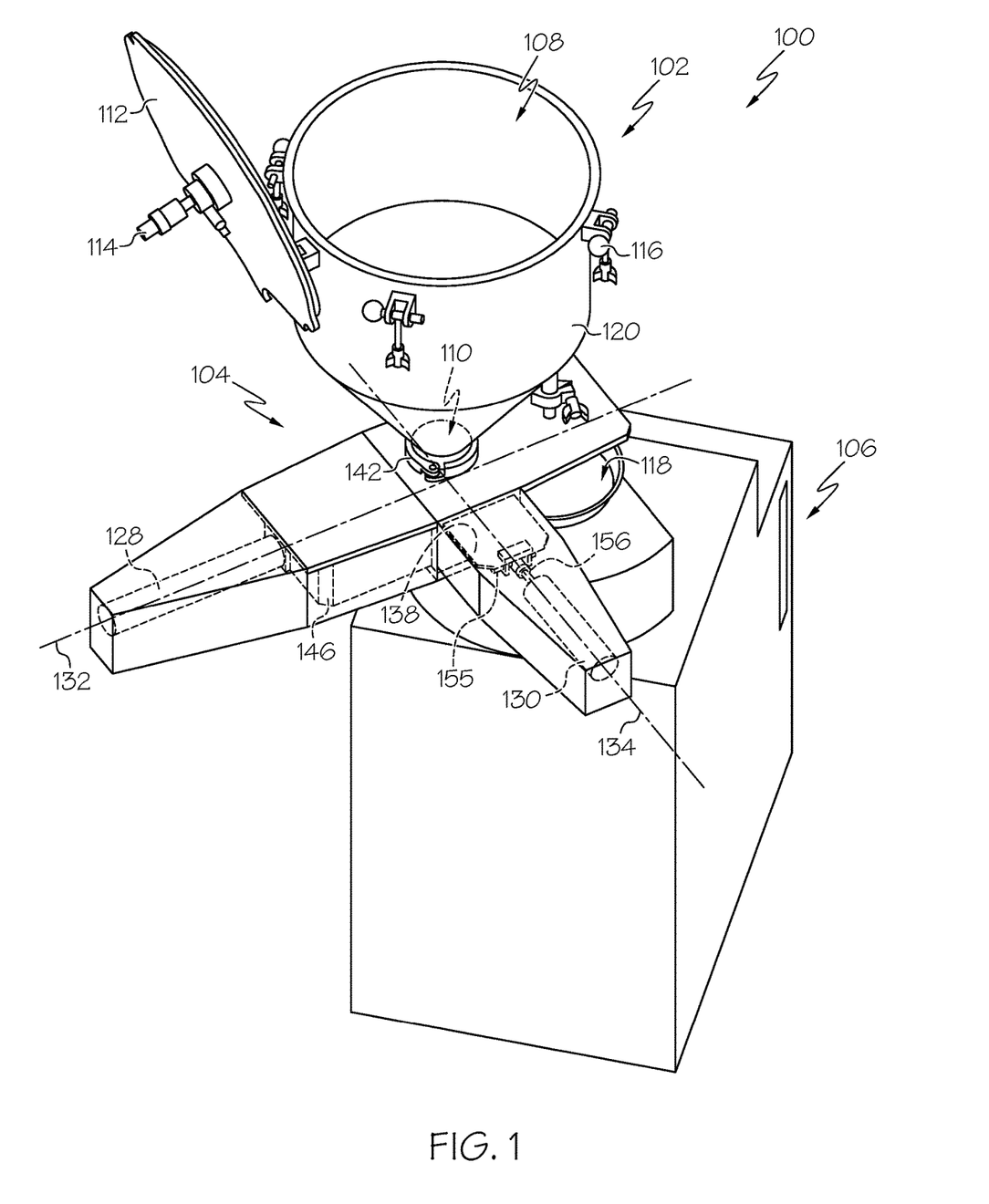
FIG. 1 depicts a dough divider with a divider assembly according to one or more embodiments shown and described herein.

Referring now to FIG. 1, a dough dividing system 100 is schematically depicted. The dough dividing system 100 generally includes a receiving assembly 102, a divider assembly 104, and a receptacle 106. In some embodiments, the receptacle 106 is, includes, or leads to a rotary dough shaper as described in U.S. patent application Ser. No. 16/367,466, which is hereby incorporated by reference in its entirety.

Figure 2:
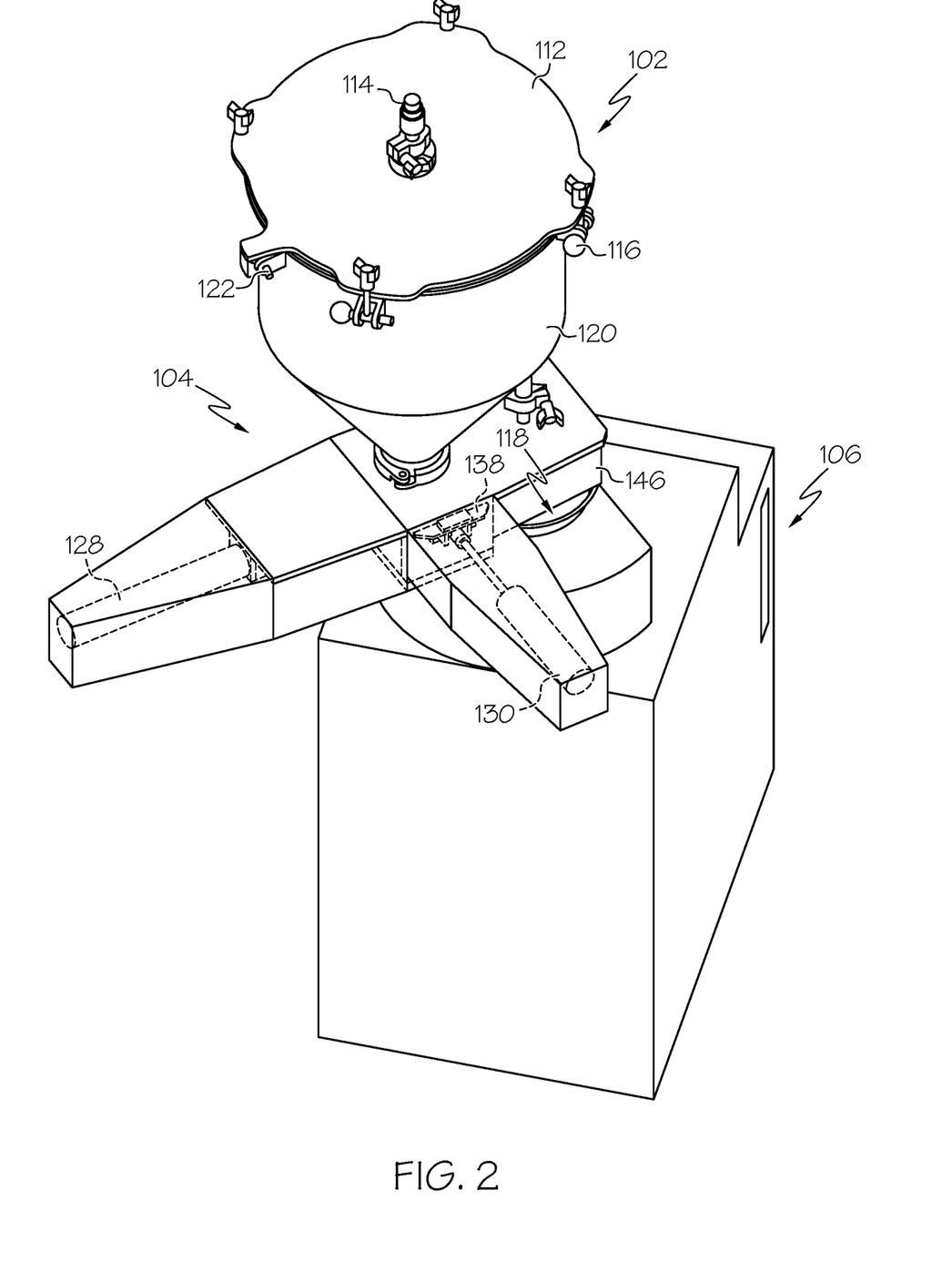
FIG. 2 depicts the dough divider of FIG. 1 with a top plate in a closed position according to one or more embodiments shown and described herein.
Figure 3:
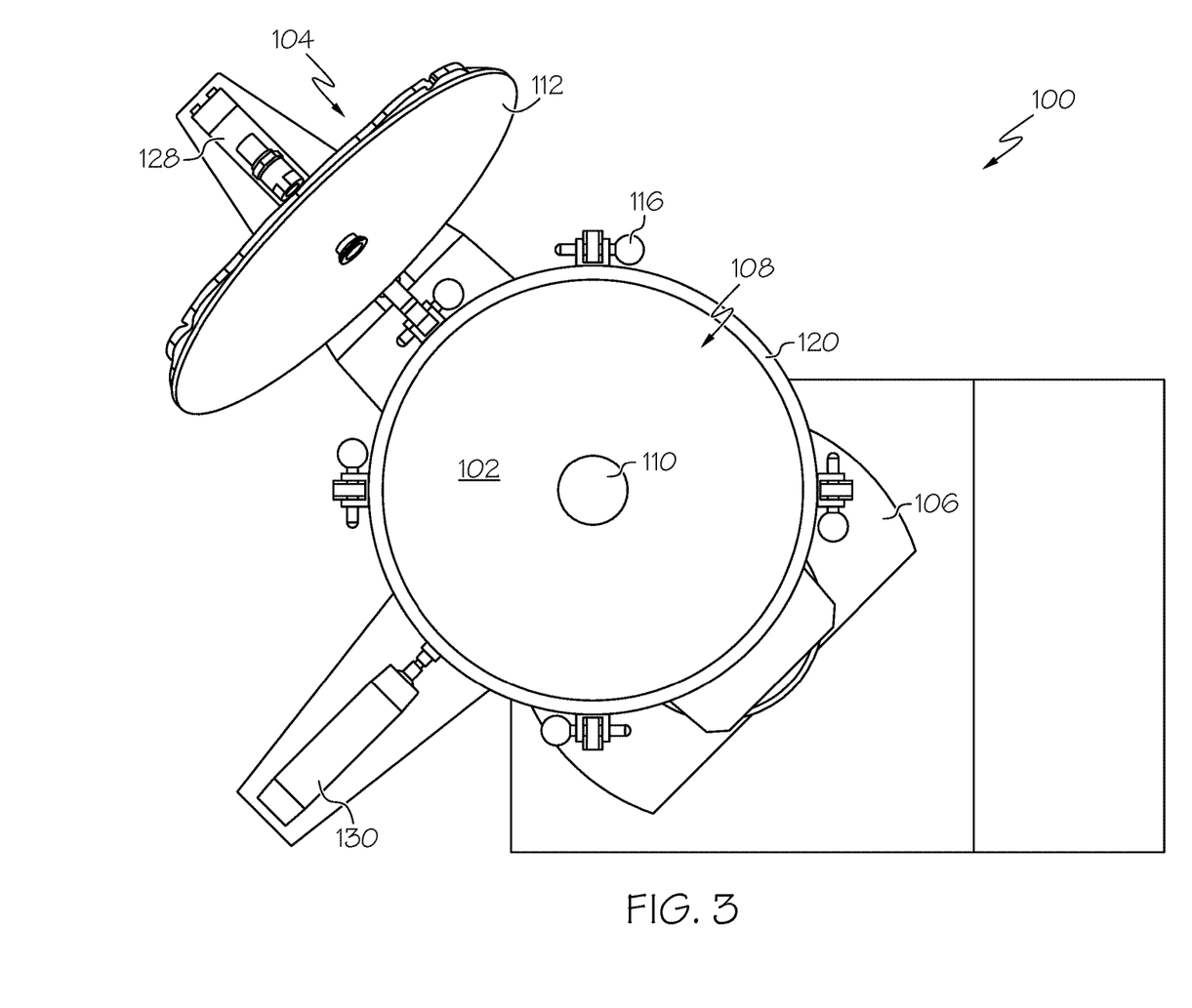
FIG. 3 depicts a top view of the dough divider of FIG. 1 according to one or more embodiments shown and described herein.

Referring to FIGS. 1, 2, and 3, the receiving assembly 102 includes a hopper 120 with a hopper inlet 108 and a hopper outlet 110, which may be positioned generally at the bottom of the hopper 120 such that contents of the hopper 120 tend to move toward the hopper outlet 110 based on the force of gravity and/or fluid pressure. The hopper 120 may be fluidly coupled to the divider assembly 104 at the hopper outlet 110 and be held in position with a clamp 142. The hopper inlet 108 may be covered by a hopper cover 112, which may include a pressurizing connection 114 for pressurizing the hopper 120 (using pressurized air, nitrogen, or some other inert gas, for example). In some embodiments, the hopper 120 may be pressurized between 0-25 psi above atmospheric pressure. In some embodiments, the hopper 120 may be pressurized between 10-20 psi above atmospheric pressure, optionally 3-5 psi above atmospheric pressure, optionally 3-10 psi above atmospheric pressure, optionally 5-15 psi above atmospheric pressure. While particular ranges of hopper pressure are disclosed herein, it is to be understood that such particular ranges are not limiting and that the hopper 120 may be pressurized to any suitable pressure. The hopper cover 112 may be sealed to the hopper 120 and held in place by one or more hopper cover couplings 116. A gasket (e.g., an o-ring or the like) (not shown) may be fit between the hopper cover 112 and the hopper 120 to form an airtight seal such that the hopper 120 can be pressurized. As best shown in FIG. 2, the hopper cover 112 may be pivotable about a hopper cover pivot 122. The hopper cover 112 may pivot to open and close the hopper 120, thereby sealing dough inside the hopper 120.

Still referring to FIGS. 1, 2, and 3, the divider assembly 104 divides dough from a mass of dough that may be in the receiving assembly 102 into dough forms and feeds the dough forms into a receptacle inlet 118 of the receptacle 106. The size and shape of the dough forms described herein are not limited by this description and it is to be understood that dough may be removed from the mass of dough in the hopper 120 in any shape or size (e.g., a cylinder, a sphere, a disc, etc.). The divider assembly 104 includes a first actuator 128 and a second actuator 130. The first actuator 128 generally moves a divider block cavity (not shown) from a first position under the hopper outlet 110 to a second position over the receptacle 106 along a first axis 132 such that dough moves from the mass of dough in the hopper 120 to the receptacle 106 as a dough form. The first actuator 128 may then move the divider block cavity back to the first position to receive more dough from the mass of dough in the hopper 120. The process may repeat as necessary to form dough forms repeatedly. Operation of the first actuator 128 and the divider block cavity is described in greater detail herein.

Figure 4A:
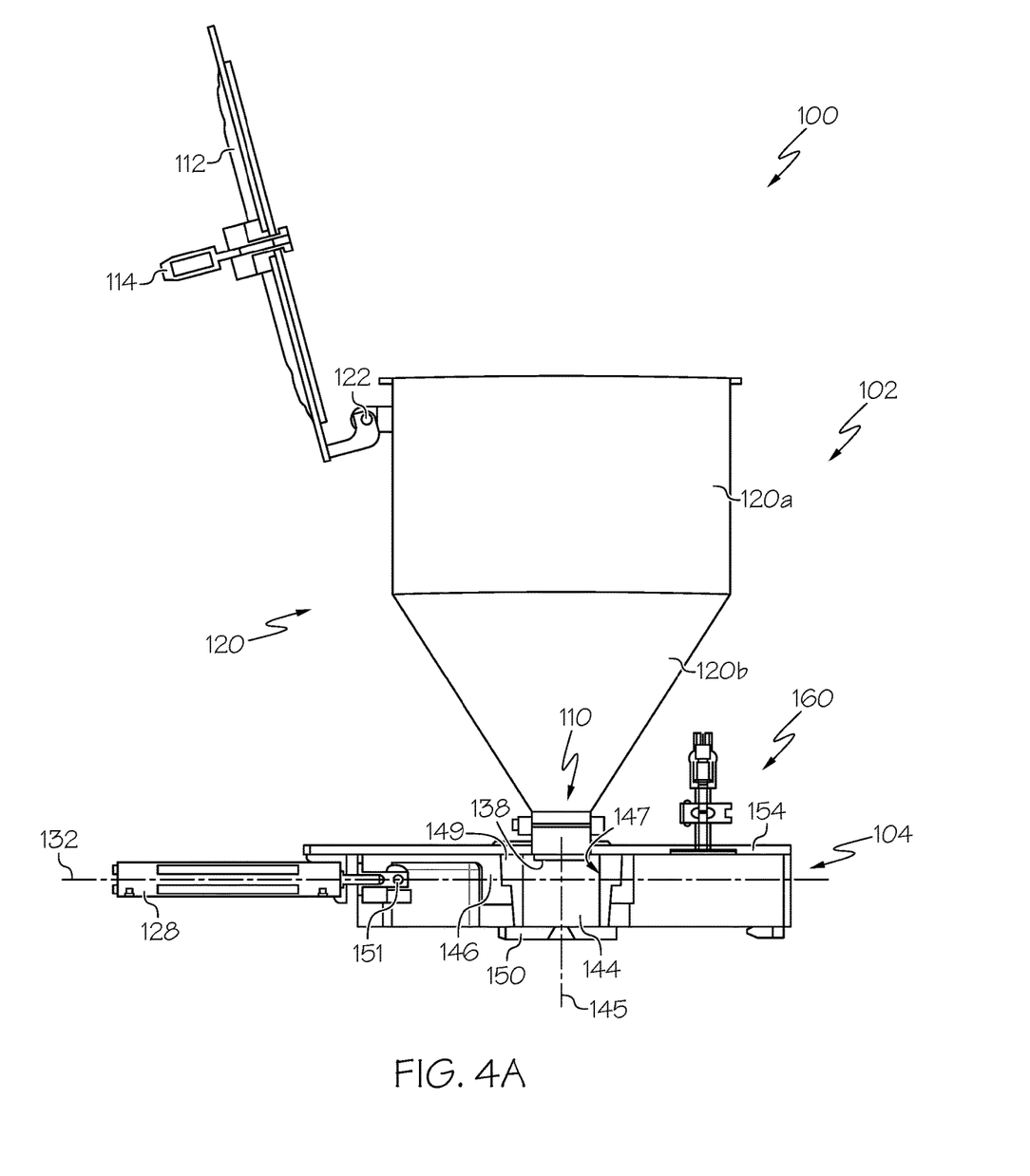
FIG. 4A depicts a side view of the dough divider of FIG. 1 with a divider assembly 104 in a first position according to one or more embodiments shown and described herein.
Figure 4B:
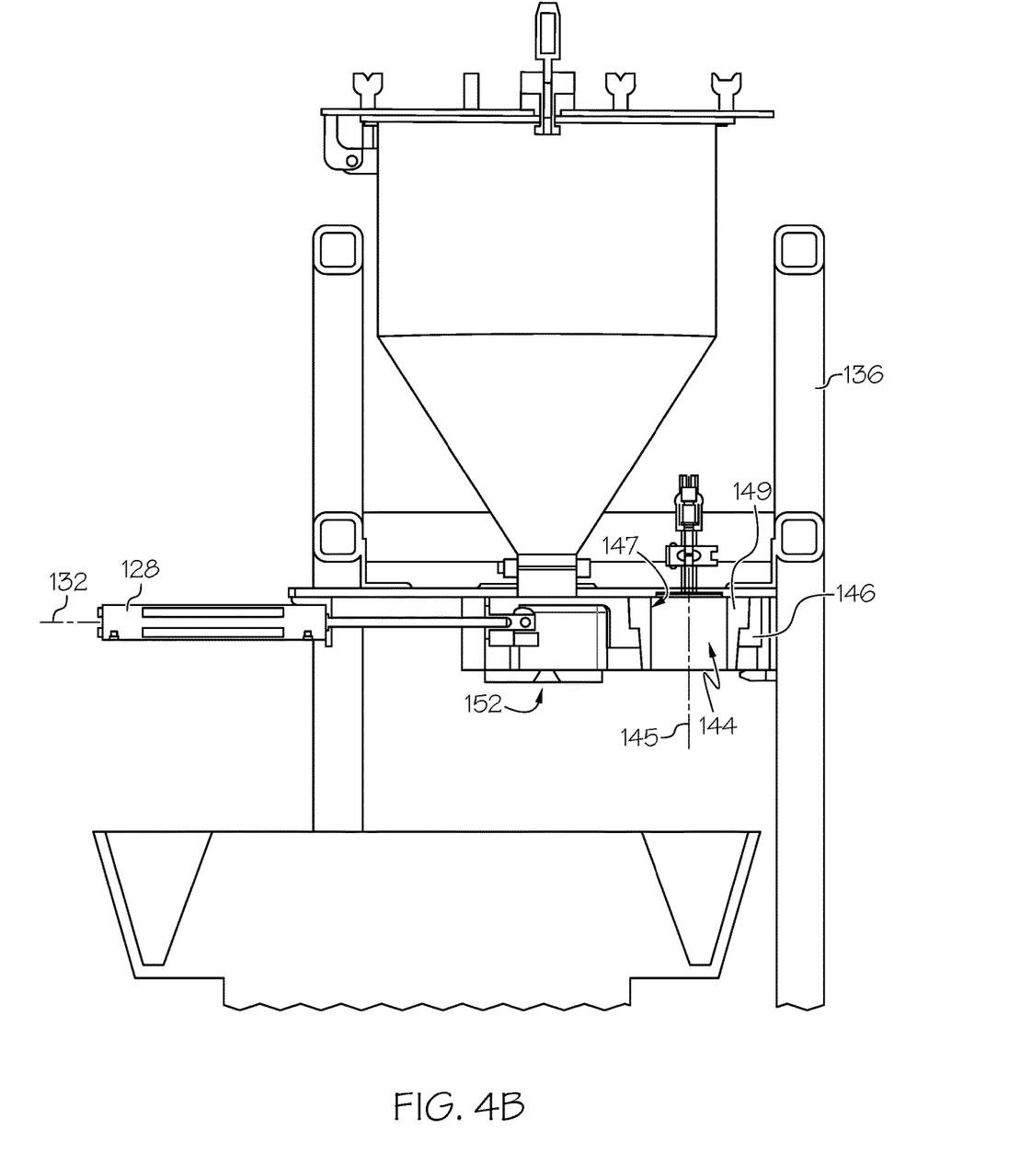
FIG. 4B depicts a side view of the dough dividing system of FIG. 1 with a divider assembly in a second position according to one or more embodiments shown and described herein.

Referring now to FIGS. 4A and 4B, portions of the receiving assembly 102 and the divider assembly 104 are schematically illustrated at a cross-section taken along the first axis 132 of FIG. 1. As shown in FIG. 4B, the dough dividing system 100 may be supported by a support assembly 136. FIG. 4A shows the receiving assembly 102 including the hopper 120, the hopper cover 112, and the hopper cover pivot 122. The hopper cover 112 is shown in an open position, allowing a user to load or unload dough from the hopper 120 at the hopper inlet 108. The hopper 120 includes a cylindrical section 120a and a conical section 120b. An inner wall of the conical section 120b may guide dough toward the hopper outlet 110. Gravity and/or fluid pressure may cause dough to advance toward the hopper outlet 110. For example, in embodiments in which the hopper 120 is pressurized via the pressurizing connection 114, the dough may be pushed through the receiving assembly 102 based on fluid pressure. The hopper 120 may be pressurized by, for example, air, nitrogen, purified air, and sterile air.

In embodiments, dough leaves the hopper 120 and enters the divider block cavity 144. The divider block cavity 144 is a void in a divider block 146 formed by a divider block cavity wall 147 or divider block cavity walls. In some embodiments, the divider block cavity 144 may be a cylindrical void surrounding a divider block cavity axis 145. In a first position, as shown in FIG. 4A, the divider block cavity axis 145 is aligned with the hopper outlet 110. In a second position, as shown in FIG. 4B, the divider block cavity axis 145 is aligned over the receptacle such that dough can exit the divider block cavity 144 and enter the receptacle 106. The divider block 146 is mechanically coupled to the first actuator 128 and moves back and forth along the first axis 132 to move dough forms from the first position to the second position as described herein. The first actuator 128 may be, for example, a linear actuator, a hydraulic or pneumatic cylinder, a linear motor, or some other device for actuating linear motion. The divider block 146 may be made from a plastic (e.g., delrin, polypropylene, polyethylene, polystyrene, etc.), a metal or metal alloy, or some other material (e.g., wood). In some embodiments, the divider block 146 includes one or more weight saving features that may result in less energy being required to actuate the divider block 146.

A specific volume of dough may move from the hopper 120 to the receptacle 106. When the divider block 146 is in the first position, a divider bottom plate 150 is positioned beneath the divider block cavity 144 such that the divider bottom plate 150 and the divider block cavity walls 147 form a volume. In some embodiments, the divider bottom plate 150 may include a weep hole 152. The weep hole 152 is a discontinuity in the divider bottom plate 150 that extends from a bottom surface of the plate, through a thickness of the plate, to a top surface of the plate. The weep hole 152 creates a fluid connection between the divider block cavity 144 and the atmosphere or some volume external to the divider block cavity 144 such that air or other fluid in the divider block cavity 144 can exit the divider block cavity 144 as dough enters the divider block cavity 144 from the hopper 120 with the divider block cavity 144 in the first position. In embodiments without the weep hole 152, air or other fluid could increase the pressure within the divider block cavity 144 as dough enters the divider block cavity 144 when the divider block cavity 144 is in the first position. The weep hole 152 may relieve back pressure that would otherwise exist based on the dough displacing the air within the divider block cavity 144 which could otherwise reduce the flow of dough from the hopper 120 into the divider block cavity 144. Thus, the weep hole 152 acts as a vent allowing the free flow of dough into the divider block cavity 144 such that the divider block cavity 144 is vented to atmosphere to reduce the pressure within the divider block cavity 144 as it is filled with dough. As shown in FIG. 4B, the weep hole 152 may have a conical shape, with an opening of larger diameter at the bottom of the divider bottom plate 150, an opening of smaller diameter at the top of the divider bottom plate 150, and a tapered profile therebetween. Accordingly, the portion of the weep hole 152 with a smaller-diameter opening may be in contact with the dough, thus inhibiting dough from filling the weep hole 152 or escaping the divider block cavity 144 through the weep hole 152. Expanding the radius of the hole along a height of the weep hole may decrease the resistance to the flow (e.g., air flow) along the height of the weep hole 152.

Still referring to FIGS. 4A and 4B, the first actuator 128 may be selectively coupled to the divider block 146 at a pin connection 151. The pin connection 151 may selectively couple the first actuator 128 to the divider block 146 such that motion of the first actuator 128 affects motion of the divider block 146. It is contemplated that other types of connections may be used. For example, one or more portions of the first actuator 128 may be welded, screwed, bolted, or otherwise fastened to the divider block 146.

Still referring to FIGS. 4A and 4B, in some embodiments, the divider block cavity 144 may be pressurized by a divider pressurizer 160 when the divider block 146 is in the second position. The divider block cavity 144 may be pressurized using any inert, compressible fluid (e.g., air, nitrogen, etc.). In some embodiments, the divider block cavity 144 is pressurized by the divider pressurizer 160 at a pressure between 40-100 psi. In some embodiments, the divider pressurizer may be operated at between 50-80 psi. In some embodiments, the divider pressurizer may be operated between 55-65 psi. In some embodiments, the divider block cavity 144 is not pressurized, and dough forms fall from the divider block cavity 144 to the receptacle 106 due to the force of gravity alone. In some embodiments, the divider block cavity walls 147 may be lined with a particular coating (e.g., Teflon, Xylan, Tungsten Disulfide, etc.) that decreases adhesion and friction between dough in the divider block cavity 144 and the divider block cavity walls 147 and/or the divider block cavity walls 147 may be textured to reduce the friction between dough and the divider block cavity walls 147 (e.g., bumps, etc.). Any coating lining the divider block cavity walls 147 is a food-safe coating.

Still referring to FIGS. 4A and 4B, in some embodiments, the divider block cavity 144 may comprise a modular insert 149 that may be changed to affect one or more changes to the shape of the dough form created by the dough dividing system 100. That is, different modular inserts may be insertable into a pocket of the divider block cavity 144 to change one or more characteristics of the divider assembly 104. For example, one or more dimensions or aspects of the divider block cavity 144 may be changed. For example, a modular insert with a larger or smaller diameter than the divider block cavity 144 shown in FIGS. 4A and 4B may be inserted to change the size of the dough form that is transferred from the hopper 120 to the receptacle 106. In other embodiments, a modular insert with a shaped profile different than the cylindrical profile shown in FIGS. 4A and 4B may be inserted to change the shape of the dough forms transferred from the hopper 120 to the receptacle 106. Other aspects of the divider block cavity 144 may be changed with different modular inserts and embodiments are not limited to the particular examples disclosed herein.

Still referring to FIGS. 4A and 4B, in some embodiments, the dough dividing system 100 may include one or more sensors for determining the amount of dough within the divider block cavity 144 such that a dough form of sufficient size can be separated from the mass of dough in the hopper 120 and moved to the receptacle 106. For example, the dough dividing system 100 may include one or more weight sensors, visual sensors, or other types of sensors for determining an amount of dough within the divider block cavity 144 that are positioned within the divider block cavity 144.

Referring to FIGS. 1, 2, and 4A, some embodiments of the dough dividing system 100 include a blade 138. The blade 138 may be a flat, continuous blade that may be detachably coupled to the second actuator 130. In some embodiments, the blade 138 may include an aperture that can be aligned with the hopper outlet 110 to allow dough to pass through the aperture in the blade 138 such that the dough passes into the divider block cavity 144. In such embodiments, the second actuator 130 may move the blade 138 between positions in which (1) the aperture is aligned with the hopper outlet 110 such that dough can pass through the aperture, and (2) a solid, flat portion of the blade 138 blocks the hopper outlet 110 so that dough cannot pass through the blade 138 and into the divider block cavity 144. In other embodiments, the blade 138 may be a unitary piece (i.e., without an aperture through a thickness of the blade) such that the solid, flat portion of the blade 138 is either blocking the hopper outlet 110 preventing dough from entering the divider block cavity 144 or the blade 138 is removed from the hopper outlet 110. The blade 138 may slide between the hopper outlet 110 and the divider block cavity 144 along the second axis 134 to shear the dough that has entered the divider block cavity 144 from the hopper outlet 110. The blade 138 thus slides between an engaged position and a disengaged position to shear dough. The blade 138 may shear the dough into a dough form, separating it from the dough mass in the hopper 120. Additionally, in some embodiments, the blade 138 may remain in the engaged position to vertically support the dough in the hopper 120 and prevent it from entering the divider block cavity 144 when the divider block cavity 144 is in the first position. FIG. 1 shows the blade 138 attached to the second actuator 130, with the second actuator 130 in a retracted position and the blade 138 in a disengaged position. FIG. 2 shows the second actuator 130 in an extended position and the blade 138 in the engaged position. In the engaged position, the blade 138 may prevent dough from entering the divider block cavity 144 as well as prevent the over-pressurization of the divider block cavity 144 when the divider block cavity 144 is aligned beneath the hopper 120. This may prevent dough from being forced out of a weep hole 152 in the divider bottom plate 150 and have other beneficial effects. In some embodiments, the blade 138 may hold the dough in the hopper 120 as the divider block 146 is actuated from a first position to a second position and back to the first position from the second position as explained in greater detail herein. Holding the dough in the hopper and out of the path of the divider block 146 may reduce the amount of energy required to actuate the divider block reducing operation costs of the dough divider assembly. In the embodiment depicted in FIG. 4A, the blade 138 is in the disengaged position. Not all embodiments include the blade 138. For example, in some embodiments, the dough is sheared by a divider top plate 154 of the divider assembly 104 as the first actuator 128 moves the divider block 146 from the first position (FIG. 4A) to the second position (FIG. 4B). The second actuator 130 may be, for example, a linear actuator, a hydraulic or pneumatic cylinder, a linear motor, or some other device for actuating linear motion.

Referring to FIGS. 1 and 2, the second actuator 130 may be selectively coupled to the blade 138 at a second pin connection 155. The blade 138 may include a coupling 156 for forming the second pin connection 155. The second pin connection 155 may selectively couple the second actuator 130 to the blade 138 such that motion of the second actuator 130 affects motion of the blade 138. It is contemplated that other types of connections may be used. For example, one or more portions of the second actuator 130 may be welded, screwed, bolted, or otherwise fastened to the blade 138.

Referring to FIGS. 1, 2, 3, 4A, and 4B, operation of the dough dividing system 100 is described. As shown in FIG. 4A, the divider block 146 may be positioned in a first position with the divider block cavity 144 beneath the hopper outlet 110. The blade 138 may be in a disengaged position as dough enters the divider block cavity 144 from the hopper 120. Dough may leave the hopper 120 into the divider block cavity 144 forced by gravity and/or pressure from the pressurizing connection 114. For example, the hopper 120 may be pressurized. In some embodiments, the hopper 120 is pressurized up to 15 psi. As the divider block cavity 144 is filled with dough, air within the divider block cavity 144 may be vented to the atmosphere through the weep hole 152, thereby reducing resistance to the flow of dough into the divider block cavity 144. Once the divider block cavity 144 is filled with a sufficient amount of dough, the second actuator 130 may actuate to engage the blade 138 to separate the dough in the divider block cavity 144 from the larger mass of dough in the hopper 120. Accordingly, a dough form may be separated from the larger mass of dough in the hopper 120. Some embodiments of the dough dividing system 100 may not include the blade 138 and the dough form may be sheared from the dough in the hopper 120 by the divider top plate 154 as the divider block 146 is actuated.

In embodiments, the size of the dough form is based on the shape and size of the divider block cavity walls 147. The dough dividing system 100 may automatically determine a level of dough within the divider block cavity 144 using one or more sensors, for example, as described herein. It is to be understood that not all embodiments of the dough dividing system 100 include sensors for automatically determining a level of dough within the divider block cavity 144. In some embodiments, the divider block cavity 144 may be in the first position for a particular amount of time before the dough dividing system 100 is actuated to move the divider block cavity 144 to the second position such that the divider block cavity 144 fills with a sufficient amount of dough within the particular amount of time.

Once the divider block cavity 144 has a sufficient level of dough, the divider block 146 moves the divider block cavity 144 from the first position to the second position, as shown in FIG. 4B. That is, the divider block cavity axis 145 may be aligned over the receptacle inlet 118 shown in FIG. 2, which shows the divider block 146 over the receptacle inlet 118. With the divider block cavity 144 over the receptacle inlet 118, the divider block cavity 144 may be pressurized to force the dough form into the receptacle inlet 118 with the divider pressurizer 160. In some embodiments, dough may simply fall from the divider block cavity 144 into the receptacle inlet 118 based on the force of gravity. Once the divider block cavity 144 is empty, the first actuator 128 may actuate to pull the divider block 146 back to the first position with the divider block cavity 144 aligned with the hopper outlet 110.

In some embodiments, the blade 138 may remain in the engaged position while the divider block cavity 144 moves from the first position to the second position. In the engaged position, the blade 138 may prevent the pressurization of the divider block 146 while it is moved from the second position to the first position. This may reduce the resistance to motion of the divider block 146.

Once the divider block 146 is back in the first position, the second actuator 130 may disengage the blade 138. Accordingly, the divider block cavity 144 may refill with dough from the hopper 120. The dough dividing system 100 may operate as such creating dough forms of uniform size and consistency from the large mass of dough in the hopper 120.

Figure 5:
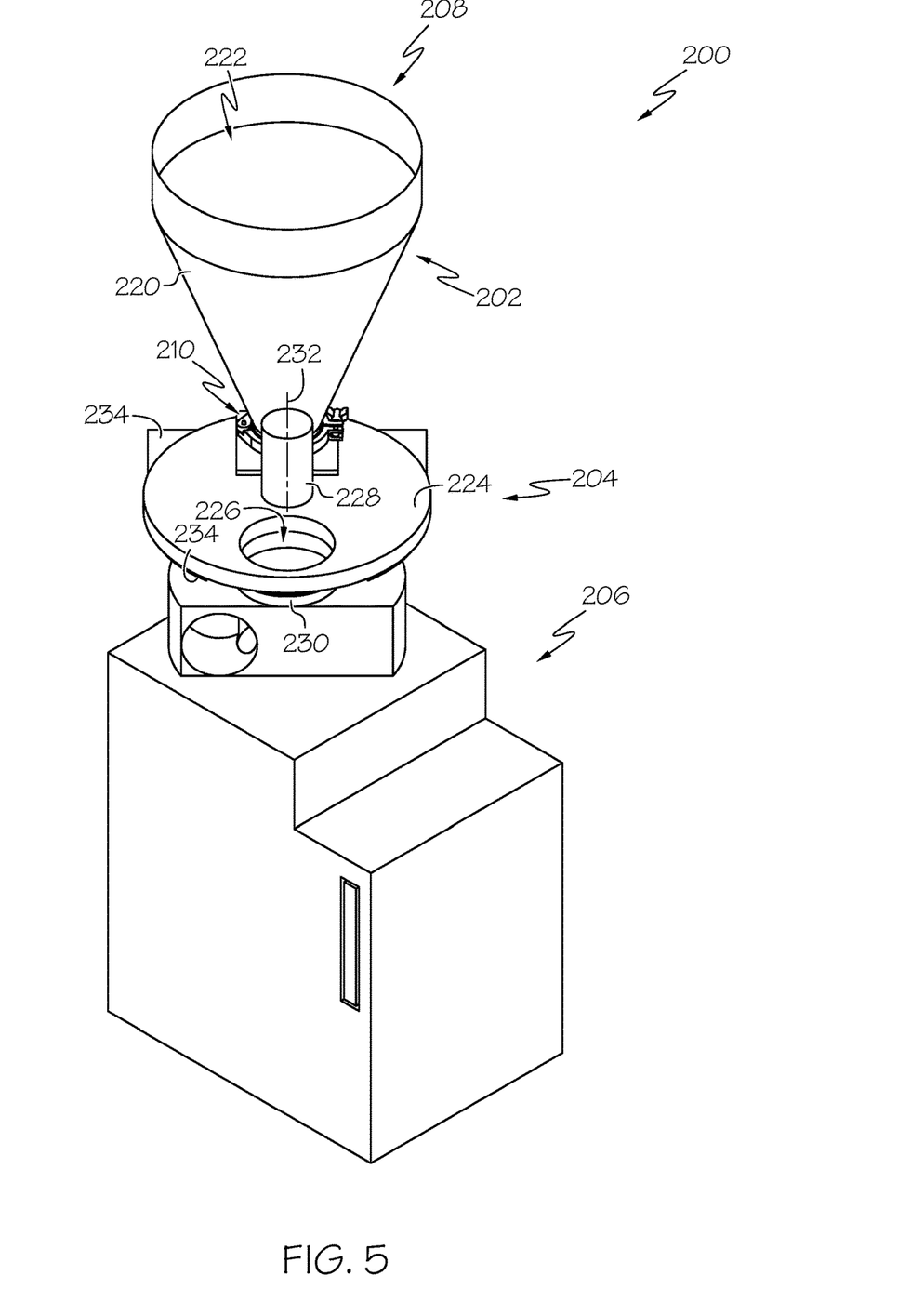
FIG. 5 depicts a perspective view of a dough dividing system including a rotating divider block according to one or more embodiments shown and described herein.
Figure 6:
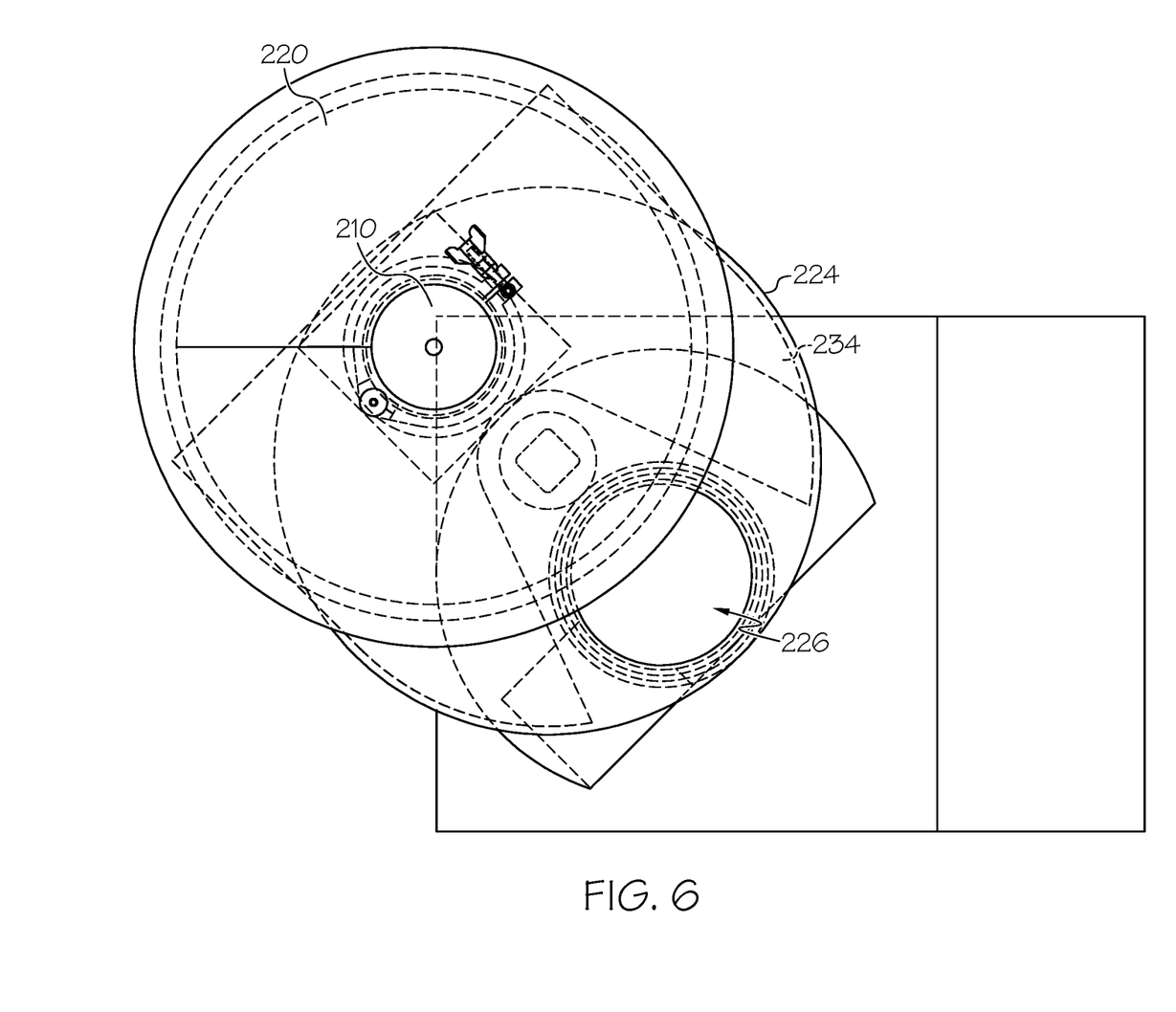
FIG. 6 depicts a top view of the dough dividing system of FIG. 5 according to one or more embodiments shown and described herein.

Referring now to FIGS. 5 and 6, a dough dividing system 200 is shown. The dough dividing system 200 includes a receiving assembly 202, a divider assembly 204, and a receptacle 206. The receiving assembly 202 may include a hopper 220 with a hopper inlet 222 and a hopper outlet 210. Dough may be placed in the hopper 220 of the receiving assembly 202. The hopper 220 may have a conical profile 208 such that dough is directed toward the hopper outlet 210 by the force of gravity and/or pressure from a pressurizing system (not shown) toward the hopper outlet 210.

The divider assembly 204 of the dough dividing system 200 includes a divider block 224 that includes a divider block cavity 226. The divider block cavity 226 may be a void in the divider block 224 that may fill with dough from via a connection with the hopper 220 at the hopper outlet 210. In some embodiments, the divider block 224 rotates about a first axis 232, which may be a vertical shearing axis, to move dough from the hopper 220 to a receptacle inlet 230 of the receptacle 206. Dough may fall from the divider block cavity 226 to the receptacle inlet 230 when at least a portion of the divider block cavity 226 is above the receptacle inlet 230.

Dough may enter the divider block cavity 226 from the hopper 220. In some embodiments, the hopper 220 may be pressurized as described herein. A user may actuate the divider block 224 using the rotating actuator 228 or cause the divider block 224 to rotate about the first axis 232 when dough is in the divider block cavity 226 separating a portion of dough from the dough in the hopper 220. The rotating actuator 228 may be a motor or other actuator that is capable of rotation about a central axis. The divider block 224 may rotate until the divider block cavity 226 is over the receptacle inlet 230, where dough may exit the divider block cavity 226 and enter the receptacle 206. In embodiments, a separation plate 234 may extend beneath the divider block 224 and may prevent dough from leaving the divider block cavity 226 until the divider block cavity 226 is above the receptacle inlet 230.

In some embodiments, the divider assembly 204 may include an apparatus or system for decreasing the friction between dough in the divider block cavity 226 and the divider block 224. For example, embodiments may include an exemplary system for decreasing the friction between dough in the divider block cavity 226 and the divider block 224 that lubricates an internal surface or other surface of the divider block cavity 226 or divider block 224 that may be in contact with dough. In some embodiments, the divider block 224 may include three or more divider block cavities 226 and the divider block cavities 226 may rotate between positions under the hopper 220, over the receptacle inlet 230, and aligned with the system for decreasing the friction between dough in the divider block cavity 226 and the divider block 224. In some embodiments, lubrication may be applied while the divider block cavity 226 is below the hopper 220 or above the receptacle inlet 230.

In some embodiments, lubrication may be applied as the divider block 224 rotates around the first axis 232. For example, lubrication may be applied at one station as the divider block 224 rotates from above the receptacle inlet 230 to the hopper 220. Divider blocks 224 may include more than two cavities (e.g., three, four, etc.). The number of positions around the divider block 224 may be increased such that dough can enter the divider block 224 at one station, the dough can exit the divider block cavity 226 at a second station, and the divider block cavity 226 can be lubricated or otherwise prepared to reduce the friction between the divider block cavity 226 and the dough at either the first station, the second station or a third station. Each of the stations may be equally spaced around the first axis 232, but that is not necessary. In some embodiments, the divider block cavity 226 may be lubricated each rotation of the divider block 224. In other embodiments, the divider block cavity 226 may be lubricated after a particular number of cycles of the divider block 224 (e.g., every fourth rotation).

In some embodiments, the divider block cavity 226 may be lubricated as it travels from the receptacle inlet 230 to the hopper 220 (or vice-versa) such that the divider block cavity 226 does not stop at a particular station for lubricating the divider block 224. The lubricant may be, for example, one or more of a food grade lubricant, a USP mineral oil for direct contact with food, a synthetic isoparaffinic hydrocarbon, and other substances generally recognized as safe. In some embodiments, the lubricant may be applied using a spray, a spritzer, a brush, and any other type of applicator now known or to be discovered.

One or more of the features or components described herein may be made from metals and alloys thereof, such as, for example, nickel, chromium, copper, or alloys thereof, or steel. While it is to be understood that not all of the features and components described herein are made from the same material, generally, the features and components that are capable of contacting edible materials (e.g., egg, yeast, flour, dough, bread, etc.) or other materials in contact with edible materials, may be made from one or more food-safe materials. For example, one or more of the features or components described herein that are capable of contacting edible materials or other materials that may contact edible materials may be made from or otherwise comprise type 304/2b stainless steel. For example, at least an internal lining of the hopper 120 may be made from or otherwise comprise type 304/2b stainless steel or other food-safe material. In embodiments, one or more components of the divider assembly 104, such as, for example, the components of the divider block cavity 144 and/or the divider block cavity wall 147 may be made from or comprise type 304/2b stainless steel. In embodiments, the receptacle inlet 118 may be made from or comprise type 304/2b stainless steel.

It should now be understood that dough may formed from a mass constituents and may be loaded into a hopper where it may be divided into multiple individual dough forms smaller than the mass of dough in the hopper. By using a system as described herein, dough may be subjected to less stress, which may result in dough forms with a higher concentration of in-tact gluten structures, which may, among other advantages, be more readily shaped and molded. Additionally, dough with in-tact gluten structures may require little or no rest before it is molded, rounded, or shaped into balls or baked into bread. Thus, the amount of time needed to generate dough that is ready to be baked is minimized. Additionally, dough that is subjected to less stress during the formation process may not require the addition of additives such as a dough conditioner in order to meet acceptable molding criteria. Thus, fewer constituent products may be needed to form baked bread, reducing production costs and increasing a desirability factor of the finished product.

Additionally, the dough divider assembly described herein can be used with a dough with a relatively higher moisture content than other types of dough dividers. The components of the assembly described herein reduce production problems with relatively high moisture content dough, such as rapid agglomeration. The assembly described herein may be less likely to be affected by flour clumping and thus require less frequent cleaning and suffer less downtime than other types of dough dividers, increasing the amount of dough that can be produced at a faster rate.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dough dividing system comprising:
   a hopper for receiving dough constituent including:
      a hopper inlet; and
      a hopper outlet;
   a divider assembly including:
      a divider block including a divider block cavity; and
      a first actuator, wherein
   a weep hole formed as a through-hole vents the divider block cavity to atmosphere,
   the first actuator moves the divider block to align the divider block cavity with the hopper outlet;
   the dough constituent enters the divider block cavity when the divider block cavity is aligned with the hopper outlet;
   the divider block moves to shear a dough form from the dough constituent; and
   the divider block moves the dough form such that the dough form can empty from the divider block cavity.

2. The dough dividing system of claim 1, wherein the first actuator is a linear actuator.

3. The dough dividing system of claim 2, wherein the linear actuator moves the divider block forward and backward in a linear motion along a divider block axis.

4. The dough dividing system of claim 1, further comprising:
   a second actuator; and
   a blade configured to slide between the divider block cavity and the hopper outlet, wherein
   the second actuator actuates to slide the blade back and forth between the divider block cavity and the hopper outlet.

5. The dough dividing system of claim 4, wherein the second actuator moves the blade forward and backward along a blade axis.

6. The dough dividing system of claim 1, wherein the hopper includes a hopper cover that seals the hopper.

7. The dough dividing system of claim 1, wherein the divider assembly further includes a divider pressurizer that pressurizes the divider block cavity when the divider block cavity is aligned with a receptacle inlet such that the divider block cavity is pressurized to force dough from the divider block cavity.

8. The dough dividing system of claim 1, further comprising a divider pressurizer configured to pressurize the divider block cavity between 40 psi and 100 psi.

9. The dough dividing system of claim 1, further comprising a plurality of modular inserts interchangeably positionable within the divider block cavity to change one or more of a size and a shape of the divider block cavity.

10. The dough dividing system of claim 1, further comprising a pressurizing connection configured to pressurize the hopper up to 15 psi.

11. A dough divider assembly comprising:
    a hopper for receiving dough;

a divider block cavity in a divider block; and a first actuator, wherein a weep hole formed as a through-hole vents the divider block cavity to atmosphere, the first actuator actuates to move the divider block between a first position and a second position, in the first position, the divider block cavity receives dough from the hopper, as the divider block cavity moves from the first position to the second position, dough in the divider block cavity is separated from a mass of dough in the hopper, and in the second position, the divider block cavity is configured such that the dough exits the divider block cavity.

12. The dough divider assembly of claim 11, further comprising a modular insert, wherein the modular insert is configured to be inserted in and removed from the divider block to change one or more of a size and a shape of the divider block cavity.

13. The dough divider assembly of claim 11, further comprising a blade, wherein the blade moves between an engaged position and a disengaged position to separate the dough in the divider block cavity from the dough in the hopper.

14. The dough divider assembly of claim 13, wherein the blade is moved between the engaged position and the disengaged position with a second actuator.

15. The dough divider assembly of claim 14, wherein the first actuator and the second actuator are controlled in response to the divider block cavity receiving a predetermined amount of dough.

16. The dough divider assembly of claim 11, wherein the divider block cavity includes a divider block cavity wall with one or more features configured to decrease the friction between the dough in the divider block cavity and the divider block cavity wall.

17. The dough divider assembly of claim 11, wherein in the second position, the divider block cavity is pressurized to force the dough in the divider block cavity out of the divider block cavity.

18. The dough divider assembly of claim 11, wherein a weep hole vents the divider block cavity to atmosphere.

19. The dough divider assembly of claim 11, further comprising a pressurizing connection configured to pressurize the hopper up to 15 psi.

* * * * *